United States Patent
Comer et al.

(10) Patent No.: US 12,210,734 B2
(45) Date of Patent: Jan. 28, 2025

(54) OCCUPANCY SURVEY TOOL

(71) Applicant: Florida Power & Light Company, Juno Beach, FL (US)

(72) Inventors: William C. Comer, Hobe Sound, FL (US); Brandy C. Suscella, Jupiter, FL (US)

(*) Notice: Subject to any disclaimer, the term of this patent is extended or adjusted under 35 U.S.C. 154(b) by 61 days.

(21) Appl. No.: 17/933,246

(22) Filed: Sep. 19, 2022

(65) Prior Publication Data
US 2024/0094880 A1    Mar. 21, 2024

(51) Int. Cl.
G06F 3/04842 (2022.01)
G06F 40/12 (2020.01)
H04L 67/52 (2022.01)

(52) U.S. Cl.
CPC .......... *G06F 3/04842* (2013.01); *G06F 40/12* (2020.01); *H04L 67/52* (2022.05)

(58) Field of Classification Search
CPC ......... G06F 3/0482; G06F 40/12; H04L 67/52
See application file for complete search history.

(56) References Cited

U.S. PATENT DOCUMENTS

| | | |
|---|---|---|
| 7,756,878 B2 | 7/2010 | Findley et al. |
| 8,090,821 B2 | 1/2012 | Holt et al. |
| 8,499,050 B2 | 7/2013 | Robins |
| 8,688,788 B2 | 4/2014 | Wilson |
| 8,897,822 B2 | 11/2014 | Martin |
| 9,171,341 B1* | 10/2015 | Trandal ............... G06F 16/2455 |
| 10,038,969 B2 | 7/2018 | Sanchez et al. |
| 10,298,411 B2* | 5/2019 | Donlan ................. G06F 16/285 |
| 10,708,077 B2 | 7/2020 | Cui et al. |
| 11,620,594 B2* | 4/2023 | Endel ..................... G06F 17/11 700/277 |
| 2004/0249894 A1 | 12/2004 | Nishimura |
| 2005/0021636 A1 | 1/2005 | Kumar |
| 2005/0035863 A1 | 2/2005 | Nelson |

(Continued)

FOREIGN PATENT DOCUMENTS

CN    110636101    12/2019

OTHER PUBLICATIONS iOffice.com; iofficecorp.com.

(Continued)

*Primary Examiner* — Ariel Mercado-Vargas
(74) *Attorney, Agent, or Firm* — Jose Gutman; Fleit Intellectual Property Law

(57) ABSTRACT

An occupancy survey system, and method, automatically surveys individual users, requiring actual human manual survey responses (and not only machine automatic responses), to determine accurate current office space location information for individual users occupying office spaces, such as in large one or more campuses each including a large number of buildings with multiple floors in each building, and accordingly collectively including large number of office spaces. The automatic occupancy survey method can be repeatedly performed in near real-time to accurately capture each surveyed individual user's space occupancy survey information, which can be accurate and timely to the date of the survey. Space occupancy survey information can be collected from various types of individual users which may not always have a mobile phone to track their current location on a campus.

20 Claims, 8 Drawing Sheets

(56) References Cited

U.S. PATENT DOCUMENTS

| | | |
|---|---|---|
| 2006/0121917 A1 | 6/2006 | Shin |
| 2007/0042791 A1 | 2/2007 | Walter |
| 2007/0072619 A1 | 3/2007 | Wei et al. |
| 2008/0200185 A1 | 8/2008 | Lovell |
| 2009/0193217 A1* | 7/2009 | Korecki ............... G06Q 10/087 |
| | | 711/170 |
| 2009/0300174 A1* | 12/2009 | Floris ..................... G06Q 10/06 |
| | | 715/764 |
| 2012/0135751 A1 | 5/2012 | Mishra |
| 2013/0127616 A1 | 5/2013 | Robitaille |
| 2014/0143356 A1 | 5/2014 | Park et al. |
| 2015/0288469 A1* | 10/2015 | Shoemaker ............. H04W 4/90 |
| | | 455/3.01 |
| 2016/0285789 A1 | 9/2016 | Hurst |
| 2017/0041749 A1 | 2/2017 | Dowlatkhah et al. |
| 2017/0171717 A1 | 6/2017 | Shulman |
| 2017/0222956 A1 | 8/2017 | Jain et al. |
| 2018/0204162 A1 | 7/2018 | Endel et al. |
| 2019/0158305 A1* | 5/2019 | Cui .......................... F24F 11/58 |
| 2020/0068351 A1 | 2/2020 | Galvez et al. |
| 2020/0191427 A1* | 6/2020 | Martin ................... G06Q 10/00 |
| 2020/0234220 A1* | 7/2020 | Ma ......................... G06F 16/288 |
| 2022/0130251 A1* | 4/2022 | Vallance ................ G06N 20/00 |

OTHER PUBLICATIONS

Officely.com; getofficely.com, Dec. 29, 20202.
Pronestar Workspace, Pronestar.com, Jan. 4, 2020.
Robin Office hoteling software; Robinpowered.com.
The active badge location system; ACM Transactions on information Systems (TOIS) 10.2 (1992); pp. 91-102.
WTF is office hoteling software?; Sara Guaglione, https://digiday.com/media/wtf-is-office-hoteling-software/, Apr. 118, 2022.

* cited by examiner

| 402 | 404 | 406 | 408 | 410 | 412 | 414 | 416 | 418 | 420 | 422 |
|---|---|---|---|---|---|---|---|---|---|---|
| USER ID | SURVEY DATE | SURVEY TIME | OCCUPANCY LOCATION | USER BADGE & PERSONAL ID INFO | LOCATION ID INFO. 1 | LOCATION ID INFO. 2 | LOCATION ID INFO. 3 | ... | USER ORG. DATA | USER EMAIL/ COMM. DATA |
|  |  |  |  |  |  |  |  | ... |  |  |
|  |  |  |  |  |  |  |  | ... |  |  |
|  |  |  |  |  |  |  |  | ... |  |  |
|  |  |  |  |  |  |  |  | ... |  |  |

| 502 | 504 | 506 | 508 | 510 | 512 | 514 | 516 | 518 | 520 |
|---|---|---|---|---|---|---|---|---|---|
| ID | SURVEY DATE/TIME | OCCUPANCY LOCATION | LOC. ID INFO. 1 | LOC. ID INFO. 2 | LOC. ID INFO. 3 | ... | OTHER LOC. DATA | USER ID DATA | USER EMAIL DATA |
|  |  |  |  |  |  | ... |  |  |  |
|  |  |  |  |  |  | ... |  |  |  |
|  |  |  |  |  |  | ... |  |  |  |
|  |  |  |  |  |  | ... |  |  |  |

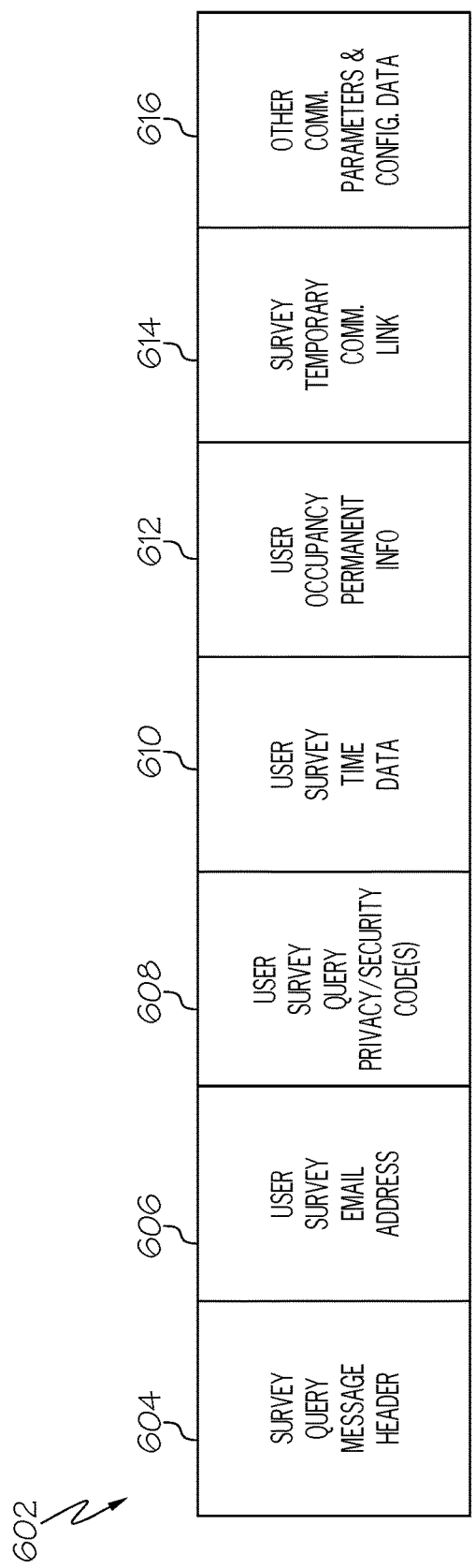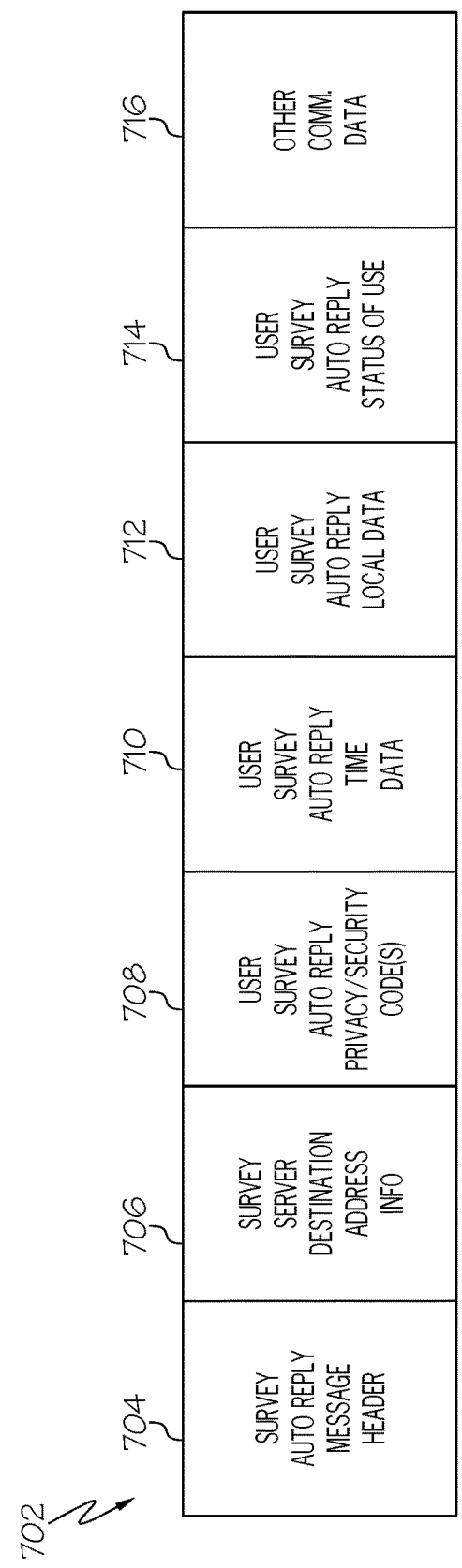

OCCUPANCY SURVEY TOOL

FIELD OF THE DISCLOSURE

The present invention generally relates to office hoteling and space management systems and methods, and more particularly to an information processing system for automatically surveying and tracking presence of a dispersed team of people, such as employees, in a large geographic region.

BACKGROUND

Updating individual office space occupancy in a large campus of office buildings is typically a manual process that requires surveying individuals to physically walk to each space in every room, in every building, in every campus, to verify the individual who is occupying that space. A survey data collector person physically walks the spaces and verifies who is utilizing a specific space, e.g., a desk in a cubicle or office. The person doing this goes to each and every space on a floor and manually writes down space assignment information on a drawing (e.g., a floor map) on a piece of paper. The information is then transferred manually by typing it into space management software, one space at a time.

This manual occupancy survey is error prone as it relies on what the survey data collector can see per location (often spaces are unmarked) and the data entry can lead to mistakes. Also, many names are common in certain areas which can lead to the wrong person being assigned a space in the space management software. Also, some spaces might not be marked properly because individuals may not be in the office at the time of an occupancy survey to validate their assigned location. For example, an individual could be at a meeting away from their assigned office space at the time of an occupancy survey.

This manual occupancy survey is very time consuming. In a large campus with many office buildings, for example, it may take days or weeks to complete an occupancy survey. This creates a logistical problem because by the time an occupancy survey is completed, some of the survey data may not be valid. The survey becomes obsolete, e.g., within a few days to a week after the start of the occupancy survey.

Additionally, although many individuals carry mobile phones on their person, there are individuals that cannot or will not carry a mobile phone on their person. Consequently, an attempt to wirelessly track an individual by their mobile phone geolocation in a campus is not always reliable to confirm a survey of all individuals occupying office space on campus.

BRIEF DESCRIPTION OF THE SEVERAL VIEWS OF THE DRAWINGS

The accompanying figures can include the same reference numerals that refer to identical or functionally similar elements throughout the separate views. These figures, together with the specification, which contains the detailed description below, serve to illustrate various embodiments and to explain different principles and advantages and are all incorporated into the present disclosure, in which:

FIG. 4 is a more detailed illustrative example of the permanent occupancy database shown in FIG. 1, according to various embodiments of the invention;

FIG. 5 is a more detailed illustrative example of the local user 1 location data repository shown in FIG. 1, according to various embodiments of the invention;

FIG. 6 is a data block diagram illustrating an example of a survey query message, according to various embodiments of the invention;

FIG. 7 is a data block diagram illustrating an example of a survey auto-reply message, according to various embodiments of the invention;

DETAILED DESCRIPTION

Figure 1:
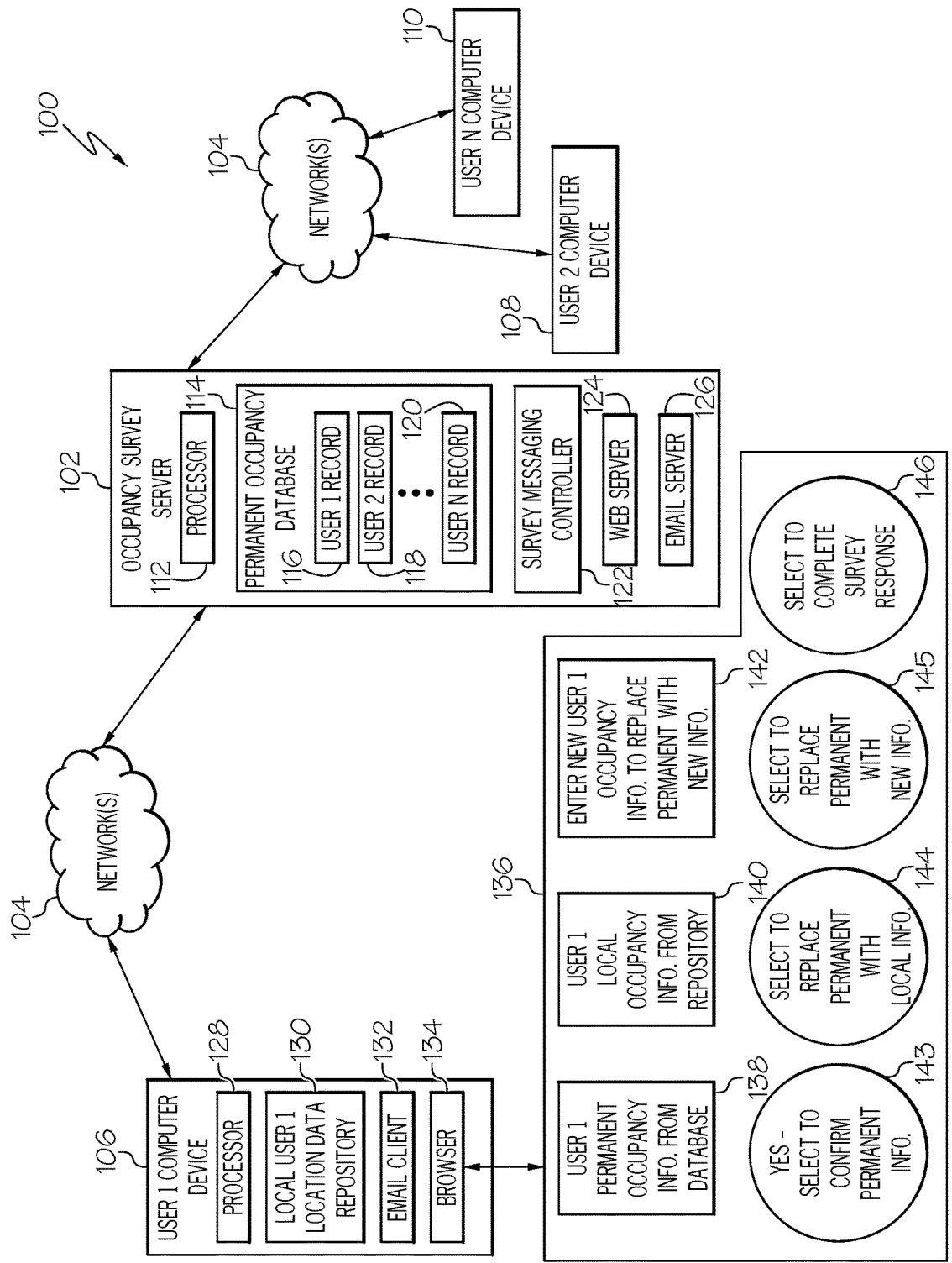
FIG. 1 is an illustrative example of an occupancy survey system, according to various embodiments of the invention.

As required, this section discloses detailed embodiments; however, the disclosed embodiments are merely examples that illustrate systems and methods described below in various forms. Therefore, specific structural and functional details disclosed herein are only non-limiting examples provided as a basis for the claims and teaching one of ordinary skill in the art to variously employ the disclosed subject matter in virtually any appropriately detailed structure and function. Further, the terms and phrases used herein are not limiting but rather provide an understandable description.

According to various embodiments, an automatic occupancy survey system (System) 100 and method can send a survey email message (a TCP/IP email message using the SMTP protocol message format) to an email address of a computer device of each individual user in a set of individual users that have space assignments registered in a System database. The survey email can include current information about the individual user and about the individual user's assigned location that a server/database of the System maintains as current for the individual user.

The survey email message can verify (e.g., up to a current date) that the individual's assigned location, or space, is still valid and occupied by the individual.

I. A first feature of the System 100 is that a computer device of the individual user will, in response to automatically receiving the survey email message, sends an automatic reply message to the System to automatically provide local current information about the individual user and the individual user's location. An automatic reply message includes local current information about the individual user and the individual user's location, which have been previously stored in the local data repository of the computer device.

The computer device of an individual user automatically detects information about the individual user and the individual user's current location, such as the individual user's ID info, current time info, and the individual user's current location information, from various sources of information in the vicinity of the computer device (which may be roaming while being carried by an individual user using the computer device). The computer device continuously collects, updates, and stores the automatically detected information in a local data storage repository of the computer device. This information can be stored into a local data storage repository of the individual's computer device, before the computer device receives the survey email message. Further description of different ways that the computer device can detect, collect, and store information, into the local data storage repository are listed below in section III.

The automatic reply message will be sent to the System independent from an individual user being at the computer device at the time the survey email is received by the computer device.

II. A second feature of the example System is that a user (individual) of the computer device, in response to receiving and viewing the survey email message in a display screen of the computer device, can send a manual reply message to the System to either confirm the permanent current information stored in a record in the System server/database is correct, or to make a change to the permanent current information stored in the record.

The individual user simply manually clicks a link provided in the survey email message. In response to the individual user manually clicking on the link in the survey email message, a browser in the computer device is directed over a network to a web page of a System server website, which displays a user interface in a display screen of the computer device. The user interface displays the following information and user-selectable commands:

1) the individual user's permanent current information stored in the System database;
2) the individual user's local current information stored in the individual's computer device; and
3) a selection command mechanism (e.g., a displayed button, displayed check boxes, etc.) that allows the individual user to review the information displayed on the display screen of the computer device and then select one of the following three options.
   a) keep the individual user's permanent current information stored in a record in the System server/database, which the individual user considers correct;
   b) update the permanent record in the System database with the individual user's local current information stored in the individual's computer device, which the individual user considers correct; or
   c) enter (e.g., type) new individual user information into a data field in the user interface to update the permanent record in the System database with this new user information, which the individual user considers correct.

In summary, the individual user can manually enter a first click on the link in the displayed survey email message received by the individual's computer device, and then review information displayed in the user interface from the web page of the System server website.

If the reviewed information looks correct to the individual user, the user can then enter a second click on a confirm/submit button in the user interface displayed at the display screen of the computer device.

Most of the time, since the permanent current information stored in the records in the System server/database do not change, individual users can quickly respond to the survey email messages with two sequential clicks on two separate elements (e.g., a first click on a link followed by a second click on a confirm/submit button) which are sequentially displayed on the display screen of the computer device. Such a two click procedure would normally complete a current survey for each particular individual, where there are no changes to the permanent current information stored in the records in the System server/database.

III. An individual user's computer device can store information about the individual user (e.g., ID info), about the individual user's location, and associated time information, which can identify the individual user's current location. This information can be stored into a local data storage repository of the individual user's computer device, before the computer device receives the survey email message.

1) Information can be stored (updated) in the local data storage repository in the computer device of an individual by the server/database of the System before the computer device receives the survey email message. This communication can be done over one or more communication networks, which can include wired or wireless networks. This can be done, for example, to initialize (or reset) the information stored in a local data storage repository of an individual's computer device. This synchronizes the local current information stored in the local data storage repository in the individual's computer device with the permanent current information stored in a record, which is associated with the individual, in the System server/database.
2) Information in the local data storage repository in the individual's computer device can be manually stored (updated) by a user (the assigned individual) of the computer device before the computer device receives the survey email message. That is, a user of the computer device can manually enter what they consider correct current location information, etc., which is associated with the individual. The manual entry can be done before the computer device receives the survey email message. This will make it quicker and easier for the individual to respond to the survey email message when received by the computer device.
3) Information in the local data storage repository can be automatically stored (updated) by the computer device before the computer device receives the survey email message. The computer device continuously stores (updates) information in the storage repository based on various events/conditions automatically detected by the computer device.

For example, a PC station being the computer device assigned to an individual user, can monitor changes in the identity of an assigned individual user, and the PC station's assigned room, desk, campus, etc., which could be detected (including wirelessly detected) by the computer device (PC station) from time to time while the PC station is operating in an assigned location, e.g., assigned region of the campus/building/floor/room/desk.

An individual user, for example, can wear an RFID tag which is detected by the computer device when in close proximity to each other. This indicates identity of an individual user using the computer device.

A desk can include an RFID tag which is detected by the computer device when in close proximity to each other. This indicates identity of a desk on which an individual user is using the computer device.

A room, as another example, can have a wireless transmitter (e.g., Wi-Fi, Bluetooth, etc.) that periodically transmits a room ID code message to all occupants. A computer device in the room can receive the room ID code message and thereby identify a room in which the computer device is currently located.

A building can have one or more wireless transmitters (e.g., Wi-Fi, Bluetooth, etc.) at strategic locations (e.g., ingress/egress points of the building, at different floors of the building) which can transmit building ID code messages. A computer device located in the building, and on a particular floor, can receive transmitted building and floor ID code messages and thereby identify a building/floor in which the computer device is currently located.

A campus can include one or more wireless transmitters (e.g., Wi-Fi, Bluetooth, etc.) that transmit campus ID code messages. A computer device in the campus can receive the campus ID code messages and thereby identify a campus in which the computer device is currently located.

In some embodiments, one or more local access points used for wireless communications (e.g., Wi-Fi or other wireless communication protocols) can provide the wireless transmissions of campus ID code messages, building ID code messages, and room ID code messages. A computer device in the vicinity of the one or more wireless transmitters can receive the various ID code messages and thereby identify a campus, a building, a building floor, and a room, in which the computer device is currently located.

In certain embodiments, the computer device can detect IP addresses via network communications between the computer device and a local area network, which can identify each of, for example, the campus/building/floor/room, which can be wirelessly transmitted and automatically received by the computer device.

IV. If there are any changes needed to the individual user's permanent current information stored in the System database, upon receiving the survey email message, and the individual user clicking on the link provided in the survey email message, the computer device will display on a display screen:
1) the individual user's permanent current information stored in the System database;
2) the individual user's local current information stored in the individual user's computer device; and
3) a selection command mechanism (e.g., a displayed button, displayed check boxes, etc.) that allows the individual user to review the information displayed on the display screen of the computer device and then select one of the following three options.
    a) keep the individual user's permanent current information stored in a record in the System server/database, which the individual considers correct;
    b) update the permanent record in the System database with the individual's local current information stored in the individual user's computer device, which the individual considers correct; or
    c) enter (e.g., type) new individual user information into a data field in the user interface to update the permanent record in the System database with this new user information, which the individual considers correct.

The following section will briefly discuss options b) and c) above.

A user interface can display in a first column on one side of a display screen the individual user's permanent current information stored in a record in the System server/database. In a second column on the other side of the display screen, the user interface can display the individual user's local current information stored in the individual user's computer device before receiving the survey email message.

As an example, each row of the two columns displays the corresponding information that is found in either the first column or the second column. On the side of each row of corresponding information in each column, there is provided a selection check box.

Additionally, on the side of each row of corresponding user location information in each column, there is provided an indicator that highlights when there is a difference between the user location information in the row in the first column and the corresponding information in the same row in the second column. That is, the user location information in the second column fails to match the user location information in the first column, both being displayed in the same row.

An individual user now sees highlighted row-by-row in the two columns where there are discrepancies between the permanent information record and the local information stored in the local data storage repository in the computer device of the individual user.

The individual user now has the option of clicking to select one of the two check boxes for selecting the correct information in each row in the two columns. By default, the check box for the permanent information record (column 1) is pre-selected.

If all information in the permanent information record appears correct to the individual user, then the individual user only clicks on the confirm/submit button in the user interface displayed at the display screen of the computer device, as has been discussed above in section II. In this case there are no changes.

If at least one of the check boxes in the second column is checked off by the individual user, then the user location information on that row from the local location information stored in the local data storage repository in the computer device will be copied and overwrite the permanent user location information in the first column (in the permanent record).

Lastly, if the individual user determines that both the permanent user location information in the first column and the local user location information in the second column for any row are both incorrect, the user can then enter (e.g., type) correct new user location information into a separate data field (e.g., text entry field) for that row which will overwrite the permanent user location information for that row in the first column (in the permanent record).

When the user has selected and/or entered all correct information displayed in the user interface, the individual user can click on the confirm/submit button in the user interface displayed at the display screen of the computer device, as has been discussed above in section II. The survey is then completed and the permanent record will now contain the correct verified space occupancy information for the individual user The survey system and method discussed above removes the need for physical walk downs of all of the physical locations of spaces in every campus/building/floor/room/desk to verify each individual user occupying that space.

A computer-implemented method automatically updates a space occupancy database coupled to the System in response to an individual user confirming by reply message (e.g., by reply email message or other type of reply message) their space assignment information, or that an exception (a change to the current permanent information record) is created for an individual. This automatic space occupancy survey can be quickly completed, and repeated even multiple times per day. In the case of repeating space occupancy surveys, the individual users that have already acknowledged and completed their occupancy survey can be removed from the subsequent repeated survey email messages in the same day to avoid repeated nuisance surveys sent to individual users that have already been located.

In addition to using emails to-from individual users to survey and confirm each individual user's occupancy status of an assigned space, this can be combined with other automatic survey technology that supplements the email-based survey data with additional confirmation of the individual user's current space occupancy status.

V. Examples of using complementary survey and verification technology.

1) a) Each individual is assigned a name tag badge that the individual carries on their person. Each desk is assigned a desk tag located at the desk. Each room is assigned a room tag at each entry-way to the room.

The individual can put their name tag badge near a reader station at select locations, such as at an entry-way to a particular room. The data is captured at the reader station and forwarded to the System to update the database.

b) The individual's badge can be read by using RFID embedded into the individual's badge and read by the reader station when the individual is physically near the reader station. The individual does not have to do anything more than walk near a reader station to have the individual's badge data read by the reader station and forwarded to the System for confirming the individual's occupancy and possibly updating a database.

c) Alternatively, the individual carries a mobile phone and when at their desk they can capture a picture of their desk tag which is a QR code and captures current time information. When the individual is at a gate-way and sees a room tag they can use their mobile phone to capture a picture of their room tag which is a QR code and captures current time information. The individual's mobile phone in response to a wireless communication "survey query" from the System can forward the desk tag ID and time information, and possibly also forwards room tag ID and time information, to confirm the precise location of the individual's assigned desk.

2) a) Each desk tag can include RFID that can communicate with an individual's mobile phone being carried on their person, and the mobile phone in response to a wireless communication "survey query" from the System can forward the desk tag ID information to confirm the precise location of the individual's assigned desk.

b) Similarly, each room tag can include RFID that can communicate with an individual's mobile phone being carried on their person, and the mobile phone in response to a wireless communication "survey query" from the System can forward the room tag ID information to confirm the precise location of the individual's assigned desk.

c) A further alternative embodiment, besides any combination listed above, this alternative adds to the combination of survey data capture:

1) Each building in a campus has a unique IP address and each floor in a building has a unique IP address, as used by access points located throughout the building, and the IP address information can be collected by the System in communicating with each computer device (e.g., a mobile phone or a desktop PC) being used by the individual while responding to the occupancy survey email. This allows additional confirmation of the individual's occupancy location when responding to a survey email.

2) Additional geolocation information can be captured from triangulation of location of a mobile phone by using access points in a vicinity (e.g., access points in a floor and in a building)

3) Additional geolocation information can be captured by the System from a computer device (e.g., a mobile phone or a desktop PC) being used by the individual while responding to the occupancy survey email. For example, a mobile phone captures RFID information (e.g., QR code) for room badge and desk badge, which are then forwarded to the System from the mobile phone in response to a survey query from the System.

4) Additional geolocation information can be captured by having a badge reader station at each desk, identified by a desk badge. The reader station will capture badge information from an individual located at the desk. The badge reader station can forward the captured individual's badge information, the desk badge information, and time information when the badge info was captured to the System.

5) The System can additionally use occupancy data for an individual that is already saved in the occupancy database which was captured from space management software (e.g., reserved space for an individual captured from space management software).

6) The System can additionally capture facial image information and/or clothing image information of an individual when each individual enters/leaves and registers that they're entering/leaving a building, a floor in a building, or a defined region in a building, and then using image recognition techniques in the building the System can determine the current status of occupancy of the registered individual in that building/floor/region of the building.

Different forms of providing the captured survey data and integrating with other computing systems.

1) provide survey output information to a map of each floor of each building of each campus.

2) combine mail codes of an individual with their location survey so that a mail room delivery system can be provided a precise location of an individual to deliver their mail, even while an individual changes their occupancy space.

3) provide output survey data to space management software to make more accurate reservations by the space management software.

4) provide output survey data to building security management software to make more accurate decision as to where key management personnel are currently located.

5) provide output survey data to a business continuity management system to determine accurate location of key personnel to possibly relocate certain key personnel based on their location being the likely front of an approaching major event and their role relative to the approaching major event. For example, a likely path of an approaching hurricane storm or wind storm, a likely path of an approaching forest fire, a possible flood condition, or an anticipated major social event such as an impending riot or other conflict situation, or the like.

Several Advantages Over The Prior Art

Maintaining, based on automatic occupancy surveys of individuals, requiring actual human survey response (and not only machine automatic response), accurate current office space location information for individuals occupying office spaces, especially useful in complicated real estate logistics, such as for multiple large campuses each including a large number of buildings with multiple floors in each building, and accordingly collectively including many office spaces.

Repeated "near real time" capture of space occupancy survey information which is timely and accurate to the date of the survey.

Capture survey information for various types of individuals which may not always have a mobile phone to track their location on campus.

Description Of Various Embodiments

The below-described examples of systems and methods provide various technical solutions for a space occupancy survey system and method, according to various embodiments. An embodiment of the system can autonomously survey a very large number of individual users via their computer devices to confirm the current office space location information for each of the individual users occupying office spaces in a campus. Such a space occupancy survey system is especially useful in complicated real estate logistics, such as for one or more large campuses including a large number of buildings with multiple floors in each building, and accordingly collectively including many office spaces for which the system can accurately and efficiently confirm space occupancy.

Various embodiments of the invention further facilitate the generation and display of reports and alerts for operation personnel and management. An alert message or warning, for example, can be provided to operation personnel if a space occupancy survey detects that a particular individual user assigned to a permanent space is surveyed and found to be currently occupying a different space than the expected assigned permanent space. In response to such a warning, for example, facilities management or security can be deployed to contact the particular individual user. Possibly, the particular individual user will then be escorted to the correct assigned to a permanent space. Alternatively, the space management records can be updated to reflect a new permanent assigned space for the particular individual user who is currently permanently assigned and occupying the new space. Furthermore, the detection and correction of such discrepancy between the permanent assigned space for an individual user and the actually occupied space by that individual user can be automatically detected and corrected by the space occupancy survey system well before the discrepancy would have been detected by human surveyors using manual survey processes.

Referring now to FIG. 1, an example of an occupancy survey system 100 is shown, according to various embodiments of the invention. The system 100, in this example, comprises a location survey server 102 and three computer devices 106, 108, 110, all communicatively coupled to one or more computer networks 104.

The location survey server 102, which may also be referred to as a location occupancy survey server, a space occupancy survey server, and an occupancy survey server, and the like, is communicatively coupled with the one or more computer networks 104. Such networks 104 can include one or more of wired networks, wireless networks, local area networks, wide area networks, specialized communication network links, or any combination thereof.

According to the example shown in FIG. 1, the one or more computer devices 106, 108, 110, are communicatively coupled with the computer networks 104. Each of the computer devices 106, 108, 110, is associated with an individual user of the each computer device. That is, the individual user is using the associated computer device.

An example of a computer device is illustrated in the user 1 computer device 106. The user 1 computer device 106 includes a processor 128 communicatively coupled with a storage memory repository 130 where user 1 space occupancy location information is stored, as will be discussed more fully below.

An email client 132, operating in the computer device 106, can communicate via the networks 104 to receive and send email messages. The email client 132 is associated with one or more email addresses stored in non-volatile storage memory (persistent memory) in the computer device 106. An email message sent, by an email server 126, in the networks 104 includes an email address, typically in a header portion of the email message. The email client 132, via the computer device 106, monitors email communications from the networks 104 and determines that a particular email message is destined for reception by the email client 132, based on comparing an email address included in the particular email message to the one or more email addresses stored in the storage memory and finding a match between the email address included in the particular email message and one of the one or more email addresses stored in the storage memory. Such an email message may also be referred herein as being addressed and destined for reception by the email client 132 in the computer device 106.

According to the present example shown in FIG. 1, the email server 126 in the occupancy survey server 102 receives a space occupancy survey query email message from the survey messaging controller 122. The space occupancy survey query email message is addressed and destined for reception by, in this example, the email client 132 in the user 1 computer device 106. The email server 126 then sends the space occupancy survey query email message into the network 104 wherein the email message has been addressed and destined for reception, via the network 104, by the email client 132.

After the email client 132 has determined that the email message is addressed and destined for reception by the email client 132, the email client 132 receives the email message and stores it in memory in the computer device 106.

Additionally, in response to receiving the space occupancy survey query email message according to this example, the processor 128 interoperates with the email client 132 to generate an automatic space occupancy survey response message. The generated automatic space occupancy survey response message includes an address of the email server 126 in the occupancy survey server 102. This address information is typically included in a header portion of the email message. This address information indicates that the automatic space occupancy survey response message is addressed and destined for reception by the email server 126 in the occupancy survey server 102. The automatic space occupancy survey response message includes the individual user's local space occupancy information collected by, and stored in the storage memory repository 130 in, the user 1 computer device 106. The email client 132 then transmits the automatic space occupancy survey response message from the computer device 106, via the computer network 104, to the email server 126 in the occupancy survey server 102.

The email server 126, in response to receiving the automatic space occupancy survey response message, transfers the automatic space occupancy survey response message payload information (e.g., the message information transported by the automatic space occupancy survey response message) to the survey messaging controller 122.

The response message payload information includes the individual user's local space occupancy information collected by, and stored in the storage memory repository 130 of, the individual user's computer device 106. The survey messaging controller 122 then copies the individual user's local space occupancy information from the response message payload information, and stores it in the user 1 record 116 in the database 114.

The survey messaging controller 122 can repeat this process for all the computer devices 106, 108, 110. In this way, the occupancy survey server 102 can automatically keep track of the current local space occupancy information that is received from each individual user's computer device 106, 108, 110, as part of responding to the respective space occupancy survey query email messages sent to the computer devices 106, 108, 110.

A user of the email client 132 can cause the email client to display the displayable information from the stored email message on a display screen of a user interface 136 (e.g., on a display) of the computer device 106, in a manner that is well known to those of ordinary skill in the art. In certain embodiments, the email client 132 can be configured such that in response to receiving the space occupancy survey query email message the email client 132 automatically displays the stored email message on a display screen of the user interface 136. The display of the email message on the display screen of the user interface 136 is not shown in FIG. 1. But this process is understood by those of ordinary skill in the art.

An individual user of the computer device 106 can actuate a user input device of the computer device 106, such as a mouse or keyboard, to select a web page link in the displayed email message such that a browser application 134 operating in the computer device 106 is automatically executed. In response to the selection of the web page link in the displayed email message, the browser application 134 follows the selected web page link pointing to a web page on an information processing system communicatively coupled with the computer network 104. The process of a browser application 134 following a user-selected web page link pointing to a web page on an information processing system on a computer network 104 is well known to those of ordinary skill in the art.

The browser 134 receives a copy of the pointed to web page that is served up across the network 104 by the web server 126. Then, in response, the browser 134 displays displayable information from the received web page on the display screen of the user interface 136.

The displayed web page, in the current example, includes displayable user information which is visibly displayed on the display screen in the user interface 136 as shown in FIG. 1. The displayed user information includes user 1 permanent occupancy information 138 that was stored in a user record 116, 118, 120, in a permanent occupancy database 114 in the occupancy survey server 102. The displayed user information, according to the example, also includes user 1 local location occupancy information 140 that was stored in the storage memory repository 130 in the computer device 106. This user 1 local location occupancy information 140 was transmitted by the computer device 106 in the automatic space occupancy survey response message payload information (e.g., the message information transported by the automatic space occupancy survey response message) to the survey messaging controller 122.

According to certain embodiments, a text-entry field 142 is also displayed in the user interface 136 to allow the user of the computer device 106 to enter new space occupancy information for the user while being surveyed by the occupancy survey server 102. This overall process will be discussed in more detail below.

At least one user-selectable user interface element 143, 144, 145, 146, is also displayed on the display of the user interface 136. Each of the at least one user-selectable user interface element, for example, may comprises one or more displayed icons that convey a selectable button, check-box, or the like. The user of the computer device 106 can select the particular at least one user-selectable user interface element and receive visual feedback on the display screen that the user's selection was accepted by the computer device 106. The user selection of the at least one user-selectable user interface element is a process that is well known to those of ordinary skill in the art. In response to user selection to indicate that the user's survey response is complete, such as by selection of the button 146, the user selection of the at least one user-selectable user interface element, and optionally any new user space occupancy information entered in the text-entry field 142, are entered into an individual user survey response message that is addressed and destined for reception by the location survey server 102. The individual user survey response message is then transmitted into the network 104 by the computer device 106.

A survey messaging controller 122 in the location survey server 102 then, in response to the email server 126 receiving the individual user survey response message, updates the user 1 permanent space occupancy record 116 in the permanent space occupancy database 114. This individual user survey response message is a manual response selected by the individual user to complete the current space occupancy survey conducted via the computer device 106 of the individual user.

The updates to the user 1 permanent space occupancy record 116 in the permanent space occupancy database 114 may take different forms based on the selections made, and the data entered, by the individual user while accessing the web page on the information processing system. These various updates to the user 1 permanent space occupancy record 116 in the permanent space occupancy database 114 will discussed in more detail below.

Figure 2:
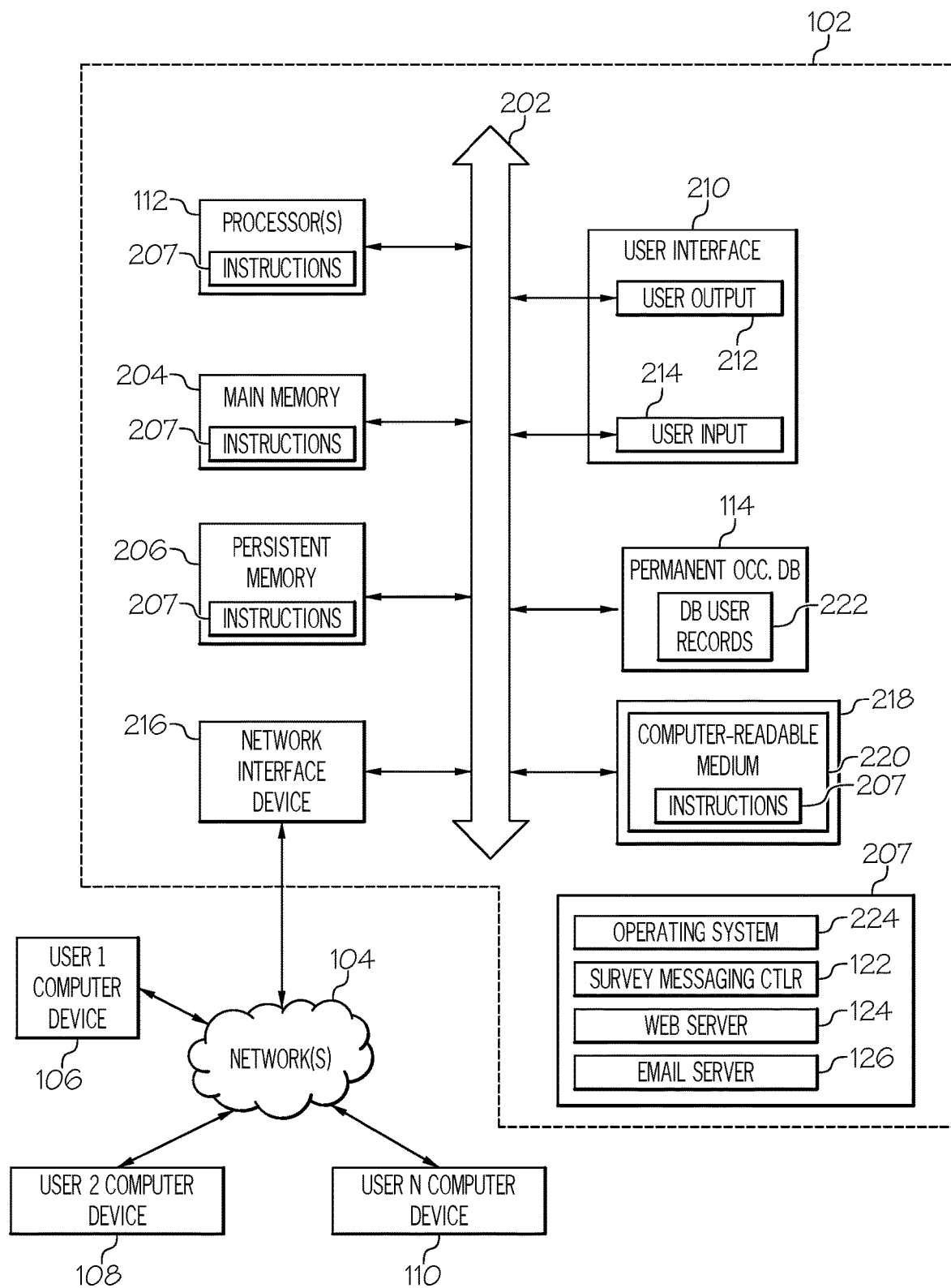
FIG. 2 is a more detailed illustrative example of the occupancy survey server of FIG. 1, according to various embodiments of the invention.
Figure 3:
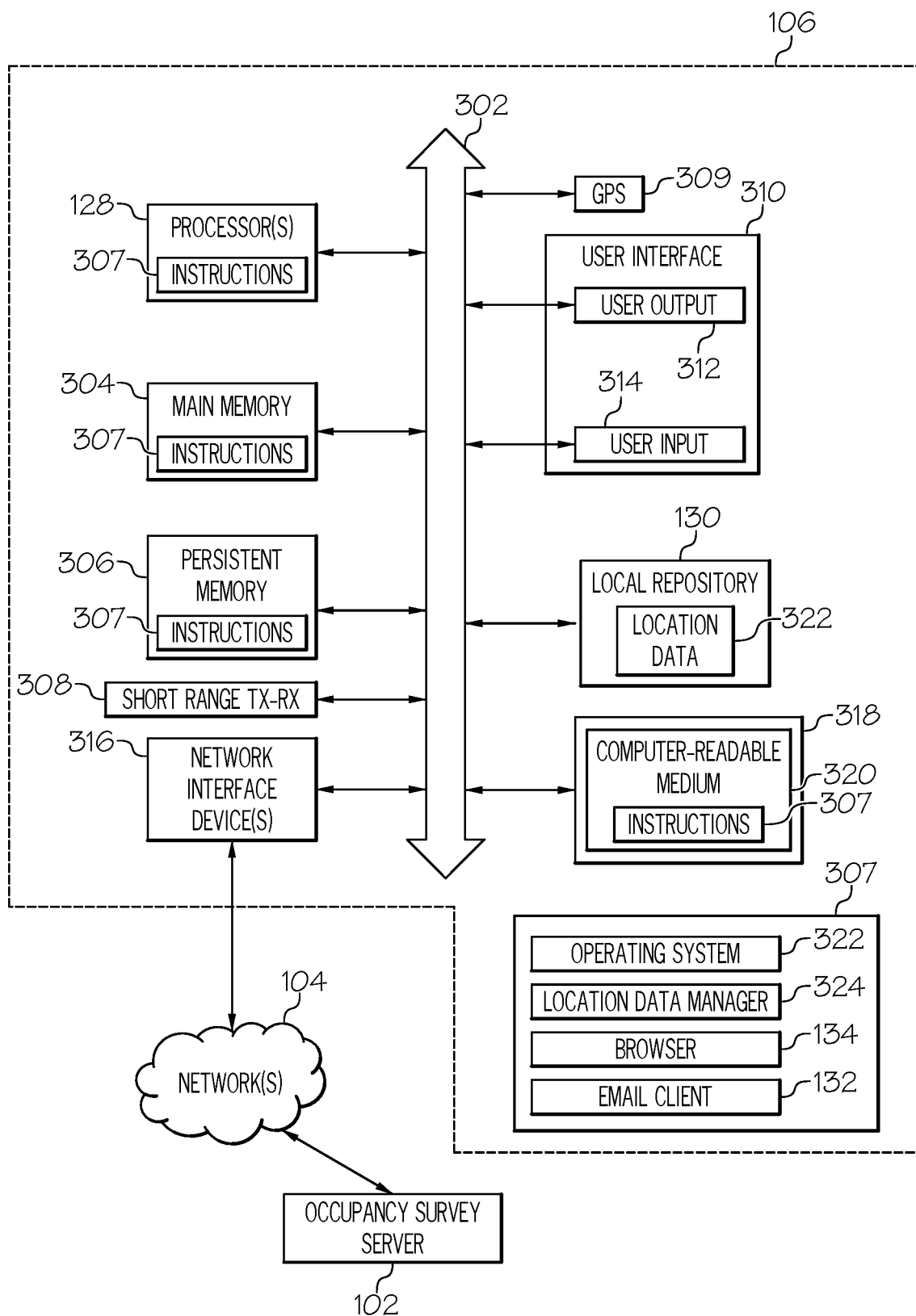
FIG. 3 is a more detailed illustrative example of the user 1 computer device shown in FIG. 1, according to various embodiments of the invention.

FIG. 2 illustrates a more detailed view of the occupancy survey server 102 which has been discussed above with reference to FIG. 1. FIG. 3 illustrates a more detailed view of the computer device 106 which has been discussed above with reference to FIG. 1.

Regarding FIG. 2, an example of an information processing system suitable for use as the occupancy survey server 102 includes various components. At least one processor 112 executes instructions 207 that cause the information processing system 102 to perform operations according to various embodiments of the invention. The processor 112, in this example, is communicatively coupled with various other components of the information processing system 102 via a system bus 202. Main memory 204 contains instructions 207, which can include computer instructions, configuration parameters, and data used by the processor 112. Persistent memory 206 can store the instructions 207 in persistent storage for the processor 112.

A user interface 210 includes a user output interface 212 and a user input interface 214 for communicating with the user (e.g., an operator or other technical personnel) using the information processing system 102. The user output interface 212 includes various output devices, such as a computer display device, indicator lights, a speaker that generates sound output to a user, or a data output interface device that can provide data and control signals to a user that comprises a computer system.

The user input interface 214 can include various input devices such as a computer keyboard, mouse device, touch screen display, a microphone that receives sound input signals from a user. The received sound signals, for example, can be converted to an electronic digital representation and stored in memory, and optionally can be used with voice recognition software executed by the processor 112 to receive user input data and commands. The user input interface 214 can include a data input interface device (not shown) that can receive data and control signals from a user that comprises a computer system.

A permanent space occupancy database 114 contains a collection of permanent space occupancy records 222. Examples of such records 116, 118, 120, have been discussed above with reference to FIG. 1. The permanent space occupancy database 114 can be communicatively coupled with the processor 112. A more detailed example of the permanent space occupancy database 114 is shown in FIG. 4, which will be discussed more fully below.

As shown in FIG. 2, the processor 112 can be communicatively coupled with a computer-readable medium 220. The computer-readable medium 220, according to the present example, is communicatively coupled to a reader/writer device 218, which is communicatively coupled via the system bus 202 to the processor 702.

The instructions 207, which can include computer instructions, configuration parameters, and data, can be stored in the computer-readable medium 220, the main memory 204, the persistent memory 206, and the processor's internal memory such as cache memory and registers.

A network interface device 216 is communicatively coupled with the processor 112 and provides a communication interface for the information processing system 102 to communicate via one or more networks 104. The networks 104, as has been discussed above with reference to FIG. 1, can include wired or wireless networks or a combination of both, and can be any of local area networks, wide area networks, or a combination of such networks. For example, wide area networks, including the Internet and the web, can inter-communicate the information processing system 102 with other information processing systems that may be locally or remotely located relative to the information processing system 102. It should be noted that mobile communications devices, such as mobile phones, Smartphones, tablet computers, lap top computers, and the like, which are capable of at least one of wired or wireless communication, are also examples of information processing systems and are also examples of the computer devices 106, 108, 110, within the scope of the present disclosure.

As illustrated in FIG. 2, the instructions 207 can include an operating system 224, the survey messaging controller 124, the web server 124, and the email server 126.

The survey messaging controller 122 interoperates with the processor 112 to cause the occupancy survey server 102 to operate according to various novel methods that are disclosed herein. Some of the operations have been described above with reference to the example of FIG. 1, in which the occupancy survey server 102 can automatically conduct repeated space occupancy surveys with each of the plurality of computer devices 106, 108, 110, and thereby updates the user records 116, 118, 120, in the permanent space occupancy database 114. The user records are updated to accurately reflect the current space occupancy information of each individual user associated with the respective each computer device 106, 108, 110.

FIG. 3 illustrates an example of an information processing system suitable for use as the computer devices 106, 108, 110. Examples of various components are also shown. The at least one processor 128 executes instructions 307 that cause the information processing system 106 to perform operations according to various embodiments of the invention. The processor 128, in this example, is communicatively coupled with various other components of the information processing system 106 via a system bus 302. Main memory 304 contains instructions 307, which can include computer instructions, configuration parameters, and data used by the processor 128. Persistent memory 306 can store the instructions 307 in persistent storage 306 for the processor 128.

A user interface 310 includes a user output interface 312 and a user input interface 314 for communicating with the user (e.g., an operator or other technical personnel) using the information processing system 106. The user output interface 312, for example, includes various output devices, such as a computer display device, indicator lights, a speaker that generates sound output to a user, or a data output interface device that can provide data and control signals to a user that comprises a computer system.

The user input interface 314, for example, can include various input devices such as a computer keyboard, mouse device, touch screen display, a microphone that receives sound input signals from a user. The received sound signals, for example, can be converted to an electronic digital representation and stored in memory, and optionally can be used with voice recognition software executed by the processor 128 to receive user input data and commands. The user input interface 314 can include a data input interface device (not shown) that can receive data and control signals from a user that comprises a computer system.

A local storage memory repository 130 of the individual user's computer device 106 contains a collection of local space occupancy information of the individual user. Examples of such local space occupancy information have been discussed above with reference to FIG. 1. The local storage memory repository 130 can be communicatively coupled with the processor 128 via the system bus 302. A more detailed example of the local storage memory repository 130 is shown in FIG. 5, which will be discussed more fully below.

As shown in FIG. 3, the processor 128 can be communicatively coupled with a computer-readable medium 320. The computer-readable medium 320, according to the present example, is communicatively coupled to a reader/writer device 318, which is communicatively coupled via the system bus 302 to the processor 128.

In certain embodiments, a short-range wireless transceiver 308 is communicatively coupled via the system bus 302 to the processor 128. The processor 128 can interoperate with the short-range wireless transceiver 308, according to various embodiments, to receive information signals transmitted from wireless transmitters in various types of devices located proximate to, e.g., in a local vicinity of, the computer device 106. Examples of such various types of devices have been discussed above. The devices, according to various embodiments, can transmit information signals that, in response to being received by the transceiver 308, indicate to the processor 128 interoperating with the location data manager 324 a current location of the computer device 106 and thereby indicate a current location of the individual user associated with the computer device 106.

The instructions 207, which can include computer instructions, configuration parameters, and data, can be stored in the computer-readable medium 320, the main memory 304, the persistent memory 306, and the processor's internal memory such as cache memory and registers.

A network interface device 316 is communicatively coupled with the processor 128 and provides a communication interface for the information processing system 106 to communicate via one or more networks 104. The networks 104, as has been discussed above with reference to FIG. 1, can include wired or wireless networks or a combination of both, and can be any of local area networks, wide area networks, or a combination of such networks. For example, wide area networks, including the Internet and the web, can inter-communicate the information processing system 106 with other information processing systems that may be locally or remotely located relative to the information processing system 106. It should be noted that mobile communications devices, such as mobile phones, Smartphones, tablet computers, lap top computers, and the like, which are capable of at least one of wired or wireless communication, are also examples of information processing systems and are also examples of the computer devices 106, 108, 110, within the scope of the present disclosure.

As illustrated in FIG. 3, the instructions 307 can include an operating system 322, the location data manager 324, the browser 134, and the email client 132.

The location data manager 324 interoperates with the processor 128 to cause the computer device 106 to operate according to various novel methods that are disclosed herein. Some example operations have been described above with reference to the example system 100 of FIG. 1. For example, the computer device 106 can automatically receive wirelessly transmitted information signals from devices that are in the vicinity local to the computer device 106, and store the received information as part of the local space occupancy information stored in the storage memory repository 130 of the computer device 106. The computer device 106 repeatedly during a day may capture various received information signals and continuously update the local space occupancy information stored in the storage memory repository 130. In this way, the location data manager 324 maintains stored in the storage memory repository 130 a set of local space occupancy information that represents the individual user's current location in a campus. Thereby, the location data manager 324 can repeatedly determine, confirm, and update in the stored local space occupancy information, its determination of the individual user's current occupancy of a space in the campus. According to various embodiments, by continuously monitoring information signals transmitted by devices in a vicinity local to the computer device 106, the location data manager 324 can continuously update the stored local space occupancy information to track the location of the computer device 106 and thereby determine current space occupancy of the individual user of the computer device 106.

During repeated survey communications between the location survey server 102 and each of the plurality of computer devices 106, 108, 110, the location survey server 102 sends a space occupancy survey query email message to each computer device 106, 108, 110, and receives an automatic space occupancy survey response message transmitted by each computer device in response to receiving its respective space occupancy survey query email message. The automatic space occupancy survey response message, from each computer device, includes the individual user's local location information collected by, and stored in the storage memory repository 130 of, the individual user's computer device 106, 108, 110. The individual user's local location information received from each of the computer devices includes the computer device's determination of current space occupancy of the individual user of the computer device 106, 108, 110.

The location survey server 102, in this way, continuously updates the user records 116, 118, 120, in the permanent space occupancy database 114, with the individual user's local location information collected by, and stored in the storage memory repository 130 of, the individual user's computer device 106, 108, 110. The user records are continuously updated with the respective computer device's determination of current space occupancy of the individual user. Each of the user records 116, 118, 120, in the permanent space occupancy database 114, thereby includes the respective computer device's determination of current space occupancy of the individual user associated with the respective each computer device 106, 108, 110.

FIG. 4 is a more detailed illustrative example of the permanent occupancy database 114 shown in FIG. 1. FIG. 5 is a more detailed illustrative example of the local user 1 location data repository 130 shown in FIG. 1.

As shown in the example database 114 of FIG. 4, each record in the database 114 is represented by a row of information fields stored in that record. A user ID 402 identifies each user record and the individual user associated with the user record. A last survey date 404 and a last survey time 406 collectively indicate the last date and time that the individual user's computer device automatically responded to, and the individual user using the computer device manually responded to, a space occupancy survey query email message sent by the location survey server 102.

Each record includes a space occupancy location 408, which has been determined by the respective computer device prior to receiving its space occupancy survey query email message. This space occupancy location information 408 represents the determination of the individual user's current space occupancy by the computer device based on its collection of information signals and other information in the computer device.

Each record also includes the individual user's badge and personal identification information 410. This information can be used to accurately identify the individual user of the computer device.

Each record, according to the example, also includes the individual user's local location information received from each of the computer devices. This information can include various location identification information 412, 414, 416, 418, based on the individual user's local space occupancy information collected by, and stored in the storage memory repository 130 of, the individual user's computer device 106.

Each record can additionally include user organizational information 420. This information can identify the individual user's formal relationship with an organization, a specific business, or another business ongoing concern, associated with the campus.

Each record includes the individual user's email address information and other communication parameters 422 that can be used by the location survey server 102 to, for example, send the space occupancy survey query email message to the individual user's computer device 106. This information 422 also can be used by the location survey server 102 in establishing communication with the computer device 106. This communication can include receiving messages from the computer device 106, as well as sending messages thereto.

As shown in the example location data repository 130 of FIG. 5, each information object stored in the location data repository 130 is represented by a row of information fields stored in that information object. Each object is a collection of local location information collected by, and stored in the storage memory repository 130 of, the individual user's computer device 106, 108, 110, during a time period between responses to space occupancy surveys communicated with the location survey server 102. That is, the current local location information represented in each row of the table in FIG. 5 comprises information collected by the computer device 106, 108, 110, up until the time of a latest response to a space occupancy survey communicated with the location survey server 102. The various information fields will be discussed below.

A location information object ID 502 identifies each object stored in the location data repository 130. A current survey date and time 504 indicates a time of the latest response to a space occupancy survey. The occupancy location field 408 includes information representing the computer device's determination of current space occupancy of the individual user of the computer device 106, 108, 110.

Each location information object, according to the example, also includes various location identification information 508, 510, 512, 514, based on the individual user's local space occupancy information collected from information signals received from transmitting devices in a vicinity of the computer device. The local location-related information from the received information signals is stored in the storage memory repository 130 of the computer device 106, as has been discussed above. Additionally, other location-related data 516 can be stored in each location information object.

Each location information object, in the example, also includes user identification information 518, or a pointer to the storage location of the user identification information, which identifies the individual user of the computer device 106 during the current survey cycle. The current survey cycle is complete at the time of the latest response to a space occupancy survey indicated by the information in the current survey date and time field 504. Each location information object, in the example, also includes user email address and communication parameters in an information field 520, or a pointer to the storage location of the user email address and communication parameters, which identifies the user email and communication parameters of the computer device 106 during the current survey cycle.

FIG. 6 shows an example space occupancy survey query email message 602. A header portion 604 of the email message 602 includes an address of the computer device 106, as has been discussed above. The address in the space occupancy survey query email message 602 makes the space occupancy survey query email message 602 destined for reception, via the networks 104, by the computer device 106.

Optionally, according to certain embodiments, one or more privacy and security codes 608 are included in the space occupancy survey query email message 602. This information field 608 may additionally be encrypted such that only the recipient computer device 106 is able to decrypt to extract the transmitted one or more privacy and security codes. The computer device 106 can compare the received codes 608 to locally stored information in the device 106 to determine if there is a match between the received codes 608 and the stored information representing the codes 608. In response to finding the match, the computer device 106 can rely on the authenticity of this space occupancy survey query email message 602 as having been sent by the location survey server 102. However, if the computer device 106 fails to find a match, then this received space occupancy survey query email message 602 is flagged as a counterfeit message 602. This flagged counterfeit information can then be alerted to the individual user of the computer device 106 and a copy forwarded (e.g., transmitted in a special message) to the location survey server 102. In this way, the operation/security personnel can be quickly notified of this warning alert condition to allow a quick response therefrom.

The space occupancy survey query email message 602 includes an information field 610 which provides user survey time information from the location survey server 102 to the computer device 106 while space occupancy is being surveyed. A web page link information field 614 is provided in the space occupancy survey query email message 602. This web page link is used by the survey protocol to facilitate the individual user confirming the correct space occupancy location information back to the location survey server 102, as has been discussed above. Additionally, other communication parameters and configuration data 616 can be included in the space occupancy survey query email message 602. This communication information 616 may be used by the computer device 106 to facilitate a communication process, such as with the location survey server 102.

FIG. 7 shows an example automatic space occupancy survey response message 702. A header portion 704 of the email message 702 includes an address of the location survey server 102, as has been discussed above. The address in the automatic space occupancy survey response message 702 makes the message 702 destined for reception, via the networks 104, by the location survey server 102.

Optionally, according to certain embodiments, one or more privacy and security codes 708 are included in the automatic space occupancy survey response message 702. This information field 708 may additionally be encrypted such that only the recipient location survey server 102 is able to decrypt to extract the transmitted one or more privacy and security codes. The location survey server 102 can compare the received codes 708 to locally stored information in the server 102 to determine if there is a match between the received codes 708 and the stored information representing the codes 708. In response to finding the match, the location survey server 102 can rely on the authenticity of this message 702 as having been sent by the computer device 106. However, if the location survey server 102 fails to find a match, then this received message 702 is flagged as a counterfeit message 702. The server 102 can then warn/alert operation/security personnel and provide a copy of the flagged counterfeit information to allow the operation/security personnel to quickly respond to this warning alert condition.

The message 702 can, according to various embodiments, include a time information field 712. This field 712 indicates a date/time when the automatic space occupancy survey response message 702 was sent to the location survey server 102 by the computer device 106.

The automatic space occupancy survey response message 702 includes a field 712 containing the individual user's local space occupancy information collected by, and stored in the storage memory repository 130 of, the individual user's computer device 106.

In certain embodiments, the automatic space occupancy survey response message 702 may include an information field 714 indicating a status of the user's current use of the computer device 106 during the survey. For example, this information field 714 can inform the location survey server 102 whether the user is currently using the computer device 106 and the user's manual survey response (via the web page) can be expected soon. If the information field 714 informs the server 102 the user is currently not using the computer device 106, this can indicate that the user's manual survey response (via the web page) will likely be delayed for some time. This can additionally indicate that the individual user is currently not in close proximity to the computer device 106. That is, the information field 712 containing the individual user's local space occupancy information may not be current or accurate. It flags a condition of uncertain survey response information being received in the automatic space occupancy survey response message 702.

The message 702 can also include other communication data 716. This can facilitate communication process between the computer device 106 and the server 102.

Figure 8:
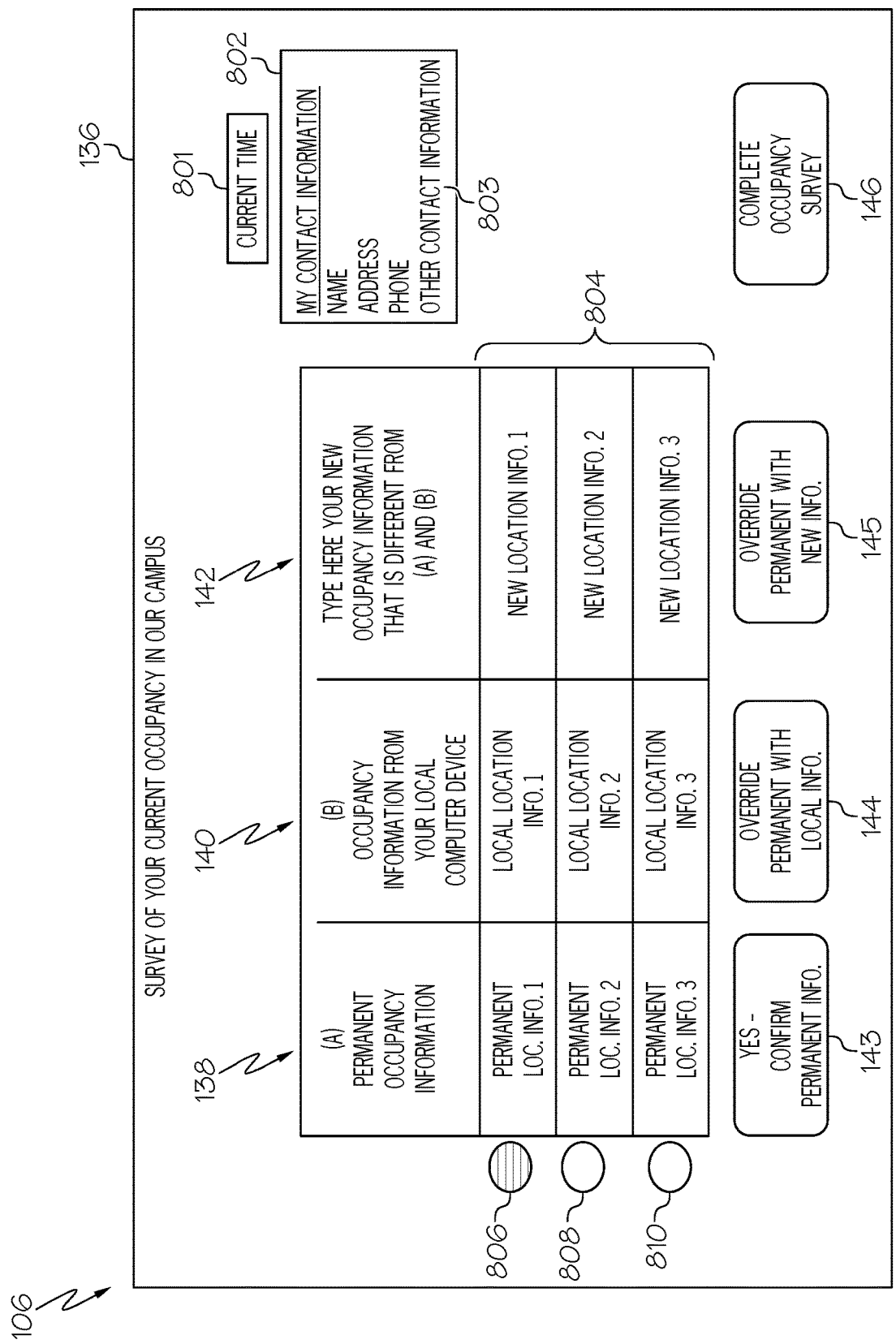
FIG. 8 is a more detailed illustrative example of the user interface of the user 1 computer device shown in FIG. 1, according to various embodiments of the invention.

FIG. 8 shows an example of a display screen in the user interface 136 of the user 1 computer device 106 shown in FIG. 1. The display screen shows the current time 801 and the individual user's contact information 802 as maintained a user record 116 in the permanent occupancy database 114. The display screen can also display other contact information 803 for the user.

The displayed location information for a space occupancy survey of the user is organized in at least one row 804 and a plurality of columns 138, 140, 142, as shown. The display screen, according to the example, displays information in cells, which each is represented as an intersection between a row and column.

Each row 804 represents one set of location information that is stored in the user record 116 in the permanent occupancy database 114. Each set of information can be surveyed during a survey cycle between the location survey server 102 and the computer device 106.

A first column 138 shows, in this example, at least one cell containing permanent location space occupancy information from the user record 116. That is, this is the permanent space occupancy information maintained by the server 102 for this user of the computer device 106.

The second column shows, in this example, at least one cell containing the individual user's local space occupancy information collected by, and stored in the storage memory repository 130 in, the user 1 computer device 106. This information was provided to the server 102 by the automatic space occupancy survey response message 702, which previously transmitted from the computer device 106, via the network 104, to the location survey server 102.

Optionally, in certain embodiments, there is a third column 142 for each row 804. The cell at the intersection of the third column and each row contains a blank text-entry field for accepting displayed text typed into the third cell via the browser application 134 operating in the individual user's computer device 106. The user can type information into the third cell 142 on a row 804 when the user determines that neither the space occupancy location information displayed in cell 1 nor that displayed in cell 2 in the same row 804 is correct. The user can type different space occupancy location information for the user, where this typed information is different from the information in cells 1 and 2, and determined to be the correct space occupancy location information by the user.

In certain embodiments, there is an indicator 806, 808, 810, displayed in association with each row 804. In the current example there is a set of indicators 806, 808, 810, for multiple rows 804. Each indicator can comprise, for example, one or more displayed icons that can visually indicate on the display screen 136 that the displayed user space occupancy location information in the second cell 140 fails to match the displayed user space occupancy location information in the first cell 138. The indicator can change appearance on the display screen to indicate that the information displayed in the second cell 140 fails to match the information displayed in first cell 138.

For example, as shown in FIG. 8, the indicator 806 for the first row 804 displays highlighted (or can display differently, in various ways, from a displayed default indicator). Note that there are different ways the indicators can convey the condition that the information displayed in the second cell 140 fails to match the information displayed in first cell 138. For example, color can be used to convey this difference. Green color, for example, could indicate a match while red color could indicate a failure to match. As another example, the indicators could be represented by different icons displayed on the display screen. One icon could indicate a match while another icon could indicate a failure to match.

This indicator 806 visually informs the user that the displayed user space occupancy information in the second cell 140 fails to match the displayed user space occupancy information in the first cell 138. The other two indicators 808, 810, are displayed in a default appearance (e.g., unhighlighted) to visually inform the user that the displayed information in the second cell 140 matches the displayed information in the first cell 138. The use of these indicators 806, 808, 810, can facilitate a user's visual inspection, and comparison, of the permanent space occupancy information displayed in the first cell 138 and the user's local space occupancy information displayed in the second cell 140.

After the user visually inspects the displayed two cells 138, 140, or possibly three cells 138, 140, 142, containing space occupancy information for the user, the user can determine which one is the correct current space occupancy information for the user.

After the user determines which is a correct current space occupancy information for the user, the user can actuate a user input device 314, such as a mouse or a keyboard, to select in this example, one of three displayed user interface elements, e.g., buttons, 143, 144, 145.

The user's selection of the first button 143 indicates to the web page on an information processing system, such as the web server 124 in the location survey server 102, that the user determined that the permanent space occupancy information displayed in the first cell 138 is the correct information for the user.

The user's selection of the second button 144 indicates to the web page on the information processing system that the user determined that the individual user's local space occupancy information displayed in the second cell 140 is the correct information for the user. The information displayed in the second cell 140 represents the individual user's local space occupancy information collected by, and stored in a storage memory repository 130 of, the individual user's computer device 106.

The user's selection of the third button 145 indicates to the web page on the information processing system that the user determined that the new user's space occupancy information entered into the text-entry field displayed in the third cell 142 is the correct information for the user. The new user's space occupancy information displayed in the third cell 142 represents the individual user's new space occupancy information which will override and replace the permanent space occupancy information displayed in the first cell 138. That is, the user record 116 will be updated with the new information from the third cell 142.

Finally, in this example, the user can select the right-most button 146 displayed on the display screen 132 to complete the user's manual survey response. That is, the web page is returned to the web server 124 with the user-selected correct current space occupancy information for the user. The location survey server 102 can then update the user record 116 to confirm the correct and current space occupancy information for the user is now stored in the user record 116 as the permanent space occupancy information for the user.

It should be noted that while three buttons 143, 144, 145, are shown in the example of FIG. 8, various embodiments can use at least one button to capture the user's selection of the correct space occupancy information for the user. For example, a single button, e.g., button 144, could be used to indicate that the information in the second cell 140 is the correct information for the user. If no selection of the button 144 (associated with the second cell 144) is made at the time that the complete occupancy survey button 146 is selected by the user the first cell 138 is, by default, the selected cell and the information displayed in the first cell 138 is the correct space occupancy information for the user.

Figure 9:
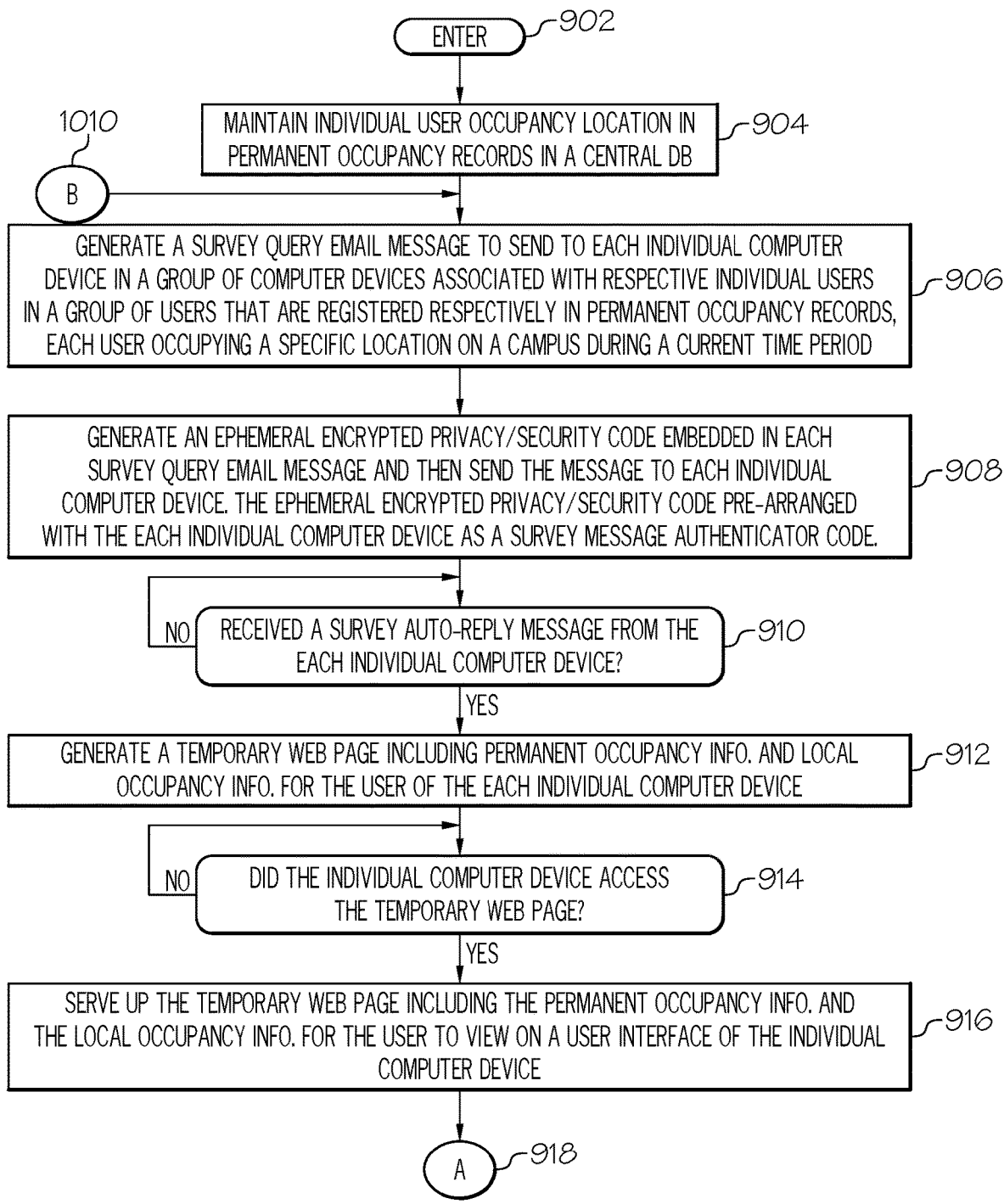
FIGS. 9 to 10 are operational flow diagrams illustrating example operations of the system of FIG. 1, according to various embodiments of the invention.
Figure 10:
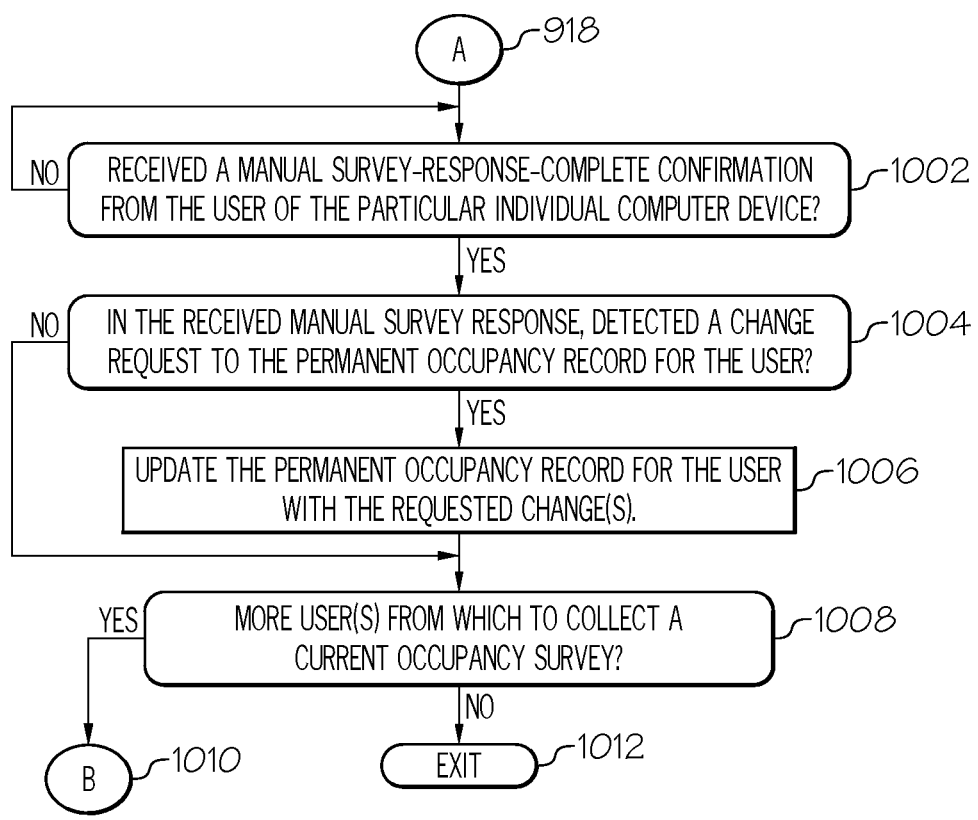

Now with reference to FIGS. 9 to 10, a set of operational flow diagrams illustrates example operations of the system 100 of FIG. 1, according to various embodiments of the invention.

The location survey server 102 enters an operational sequence, at step 902, and then immediately proceeds to maintain individual user records 116, 118, 120, in a permanent space occupancy database 114, at step 904. The location survey server 102, at step 906, generates a space occupancy survey query email message 602 and sends the email message 602 to the computer device 106. The email message 602 includes address information 606 for the computer device 106.

In this example, the location survey server 102 generates, at step 908, an ephemeral encrypted privacy/security code 608 which is embedded in the email message 602. After sending the email message 602, via the computer networks 104, to the computer device 106, the location survey server 102 waits, at step 910, to receive an automatic space occupancy survey response message 704 from the computer device 106. After receiving the response message 704, the location survey server 102, at step 912, generates a temporary webpage using the web server 124, as has been discussed in detail above.

The location survey server 102, at step 914, waits to detect that the computer device 106 has accessed the webpage. In response to the detecting the access to the webpage, the location survey server 102, at step 916, serves up the webpage to the browser 134 in the computer device 106. The browser 134 displays on the display screen of the user interface 136, as has been discussed above, the permanent space occupancy information and the local space occupancy information for the user of the computer device 106.

The location survey server 102 continues the operational sequence, at step 918, and proceeds immediately, at step 1002, to wait for the user to confirm that the survey response is complete by selecting the button 146 on the display screen.

If the user's completed manual survey response indicates, at step 1004, that the user requests a change of the permanent space occupancy information in the user record 116, by having selected in the webpage the button 144 associated with the user's local space occupancy information in the second cell 140, or in certain embodiments the user having selected the button 145 associated with the new space occupancy information that the user entered into the third cell 142, the location survey server 102 updates, at step 1006, the user record 116 with the requested changes to the permanent space occupancy information stored in the user record 116.

If the location survey server 102 determines, at step 1008, that there are more users from which to collect a current space occupancy information survey, the location survey server 102 proceeds to step 1010 and immediately returns to step 906 to repeat the method steps already discussed above starting with step 906 and applied to a next user record 118, 120.

In this way, the location survey server 102 can repeatedly automatically survey for current space occupancy information for a plurality of individual users by communicating with each user's computer device 106, 108, 110.

As will be appreciated by one of ordinary skill in the art, in view of the discussions herein, aspects of the present invention may be embodied as a system, method, or computer program product.

Accordingly, one or more aspects of the present invention may take the form of an entire hardware embodiment, an entire software embodiment (including firmware, resident software, micro-code, etc.), or an embodiment combining software and hardware aspects that may all generally be referred to herein as a "circuit", "module", or "system". Furthermore, parts of the present invention may take the form of a computer program product embodied in one or more computer-readable medium(s) having the computer readable program code embodied thereon.

A system 100 may utilize any combination of computer-readable medium(s). The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the preceding.

More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the preceding. In the context of this document, a computer-readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the preceding.

Computer program code for carrying out operations for aspects of the present invention may be written in any combination of one or more programming languages, including an object-oriented programming language such as Java, Smalltalk, C++, or the like, and conventional procedural programming languages, such as the "C" programming language or similar programming languages. According to various embodiments of the invention, the program code may execute entirely on a user's computer, partly on a user's computer, as a stand-alone software package, partly on a user's computer and partly on a remote computer or entirely on a remote computer or a server. In the latter scenario, the remote computer or the server may be connected to the user's computer through any type of network, including one or more of a local area network (LAN), a wireless communication network, a wide area network (WAN), or a connection may be made to an external computer (for example, through the Internet using an Internet Service Provider).

Aspects of the present invention have been discussed above with reference to flow diagram illustrations and/or block diagrams of methods, apparatus (systems), and computer program products according to various embodiments of the invention. It will be understood that each block of the flow diagram illustrations and/or block diagrams and combinations of blocks in the flow diagram illustrations and block diagrams can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices, to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices, to cause operational steps to be performed on the computer, other programmable apparatus, or other devices, to produce a computer-implemented process (or method) such that the computer instructions which execute on the computer or other programmable apparatus provide processes for implementing the functions/acts specified in the flow diagram and/or block diagram block or blocks.

The terminology used herein is to describe particular embodiments only and is not intended to be limiting of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "a" or "an," as used herein, are defined as one or more than one. The term plurality, as used herein, is defined as two or more than two. The term another, as used herein, is defined as at least a second or more. The terms "including" and "having", as used herein, are defined as comprising (i.e., open language). The term "coupled", as used herein, is defined as "connected," although not necessarily directly and not necessarily mechanically. The term "configured to" describes the hardware, software, or a combination of hardware and software that is adapted to, set up, arranged, built, composed, constructed, designed, or that has any combination of these characteristics to carry out a given function. The term "adapted to" describes the hardware, software, or a combination of hardware and software capable of performing, able to accommodate the performance of, that is suitable to perform, or that has any combination of the characteristics mentioned above to perform a given function.

The description of the present invention has been presented for purposes of illustration and description but is not intended to be exhaustive or limited to the invention in the form disclosed. Many modifications and variations will be apparent to those of ordinary skill in the art without departing from the scope of the invention. Each embodiment was chosen and described in order to best explain the principles of the invention and the practical application and to enable others of ordinary skill in the art to understand the invention for various embodiments with various modifications as are suited to the particular use contemplated.

What is claimed is:

1. A computer-implemented method of surveying space occupancy of individual users in a campus by communicating with each individual user's computer device, the method comprising:

sending, by a location survey server communicatively coupled with a computer network, a space occupancy survey query email message addressed and destined for reception by a computer device associated with an individual user who has been assigned permanent occupancy information associated with a defined assigned user location (a space) in a defined geographic region (a campus), wherein the assigned permanent occupancy information is stored in a user record in a space occupancy database communicatively coupled with the location survey server, the space occupancy survey query email message including a web page link that when followed by a browser application operating in the individual user's computer device points to a web page on an information processing system communicatively coupled with the computer network;

receiving, by the location survey server, an automatic space occupancy survey response message transmitted, in response to, and independent from an individual user being at the computer device, receiving the space occupancy survey query email message by the computer device associated with the individual user, the automatic space occupancy survey response message including local space occupancy information of the individual user, which was collected by, and stored in a storage memory repository of, the individual user's computer device before the individual user's computer device receives the space occupancy survey query email message;

generating, with the location survey server, displayable user information in the web page, the displayable user information including:
a) the permanent space occupancy information from the user record associated with the individual, and
b) the individual user's local space occupancy information from the individual user's computer device; and
generating, with the location survey server, at least one user-selectable user interface element in the web page that when manually selected via a browser application operating in the individual user's computer device selects one of the displayable user information in a) or b) as a user manual confirmation of the individual user's correct current space occupancy information in the campus.

2. The method of claim 1, wherein the at least one user-selectable user interface element in the web page comprises
- a first user selectable user interface element visually associated with the displayable user information in a), and
- a second user selectable user interface element visually associated with the displayable user information in b); and the method further comprising:
- determining, with the location survey server, a user manual confirmation of the individual user's correct current space occupancy in the campus being the displayable user information in a), based on detecting a manual selection of the first user selectable user interface element selected from the at least one user-selectable user interface element; and
- determining, with the location survey server, a user manual confirmation of the individual user's correct current space occupancy in the campus being the displayable user information in b), based on detecting a manual selection of the second user selectable user interface element selected from the at least one user-selectable user interface element.

3. The method of claim 1, comprising:
- generating, with the location survey server, a displayable at least one indicator in the web page, the displayable at least one indicator being displayed in the web page in visual association with the displayable user information in a) and b), the indicator visually indicating whether the displayable user information in b) fails to match the displayable user information in a), and wherein the at least one user-selectable user interface element in the web page comprises:
  - a first user selectable user interface element visually associated with the displayable user information in a), and
  - a second user selectable user interface element visually associated with the displayable user information in b); and wherein with the displayable at least one indicator in the web page visually indicating that the displayable user information in b) fails to match the displayable user information in a), determining, with the location survey server, a user manual confirmation of the individual user's correct current space occupancy in the campus being:
    - the displayable user information in a), based on detecting a manual selection of the first user selectable user interface element in the web page, or
    - the displayable user information in b), based on detecting a manual selection of the second user selectable user interface element in the web page.

4. The method of claim 1, wherein the location survey server, based on detecting an information signal indicating the browser application has followed the web page link and accessed the web page on the information processing system, serving up the web page via the computer network to the individual user's computer device for display on a user interface thereof.

5. The method of claim 1, wherein the location survey server includes in the space occupancy survey query email message an email address matching an email address stored in the individual user's computer device, which identifies to an email client application operating in the individual user's computer device that the email client application is the destined recipient of the space occupancy survey query email message.

6. The method of claim 5, wherein the space occupancy survey query email message, in response to being displayed by the email client application on a user interface of the individual user's computer device, displays the web page link on the user interface, and based on the displayed web page link being manually selected by a user interface element of the email client application, automatically executing the browser application operating in the individual user's computer device which follows the manually selected web page link by its IP address to access the web page on the information processing system on the computer network and display the web page on a user interface of the individual user's computer device.

7. The method of claim 1, wherein the location survey server generates the displayable user information in a) for display in a first cell at an intersection of a first row and a first column in the displayed web page; and wherein the location survey server generates the displayable user information in b) for display in a second cell at an intersection of the first row and a second column in the displayed web page; and
- wherein the location survey server generates the at least one user-selectable user interface element in the web page comprising
  - a first user selectable user interface element visually associated with the first cell containing the displayable user information in a) in the displayed web page, and
  - a second user selectable user interface element visually associated with the second cell containing the displayable user information in b) in the displayed web page; and the method further comprising:
- determining, with the location survey server, a user manual confirmation of the individual user's correct current space occupancy in the campus being the displayable user information in a), based on detecting a manual selection of the first user selectable user interface element selected from the at least one user-selectable user interface element; and
- determining, with the location survey server, a user manual confirmation of the individual user's correct current space occupancy in the campus being the displayable user information in b), based on detecting a manual selection of the second user selectable user interface element selected from the at least one user-selectable user interface element.

8. The method of claim 7, further comprising:
- generating, with the location survey server, a displayable at least one indicator in the web page, the displayable at least one indicator being displayed in the first row in visual association with the first cell and the second cell, the indicator visually indicating whether the displayable user information in the second cell fails to match the displayable user information in the first cell; and
- with the displayable at least one indicator in the web page visually indicating that the displayable user information in the second cell fails to match the displayable user information in the first cell, determining, with the location survey server, a user manual confirmation of the individual user's correct current space occupancy in the campus being:

the displayable user information in the first cell, based on detecting a manual selection of the first user selectable user interface element in the web page, or the displayable user information in the second cell, based on detecting a manual selection of the second user selectable user interface element in the web page; and updating, with the location survey server, the assigned permanent occupancy information stored in the user record in the space occupancy database to match the displayable user information in the second cell, based on detecting the manual selection of the second user selectable user interface element in the web page.

9. The method of claim 7, further comprising:

generating, with the location survey server, a third cell at an intersection of the first row and a third column in the displayed web page, the third cell comprising a blank text-entry field for accepting displayed text typed into the third cell via the browser application operating in the individual user's computer device;

generating, with the location survey server, the at least one user-selectable user interface element in the web page comprising
a third user selectable user interface element visually associated with the third cell containing the displayed text typed into the third cell in the displayed web page; and the method further comprising:

determining, with the location survey server, a user manual confirmation of the individual user's correct current space occupancy in the campus being the displayed text typed into the third cell in the displayed web page, based on detecting a manual selection of the third user selectable user interface element selected from the at least one user-selectable user interface element.

10. A computer-implemented method of surveying space occupancy of individual users in a campus by communicating with each individual user's computer device, the method comprising:

providing a space occupancy database communicatively coupled with a location survey server, the location survey server being communicatively coupled with a computer network, the space occupancy database comprising a plurality of user records respectively associated with a plurality of individual users, each user record containing an individual user's assigned permanent occupancy information associated with a defined assigned user location (a space) in a defined geographic region (a campus);

providing a plurality of computer devices each being respectively associated with an individual user in the plurality of individual users, the plurality of computer devices being communicatively coupled with the computer network, wherein each computer device in the plurality of computer devices includes a storage memory repository that stores local space occupancy information of the individual user respectively associated with the each computer device;

collecting, by a computer device in the plurality of computer devices, local space occupancy information of an individual user respectively associated with the computer device, based on the computer device receiving information signals from, and while operating in, a vicinity local to the computer device, and storing the local space occupancy information in the storage memory repository of the computer device;

sending, by the location survey server, a plurality of space occupancy survey query email messages, each being addressed and destined for reception respectively by each computer device in the plurality of computer devices respectively associated with each individual user in the plurality of individual users, the each space occupancy survey query email message including a web page link that when followed by a browser application operating in the each individual user's computer device points to a web page on an information processing system communicatively coupled with the computer network;

receiving, by the location survey server, an automatic space occupancy survey response message transmitted, in response to, and independent from an individual user being at the computer device, receiving the space occupancy survey query email message by the computer device associated with the individual user, the automatic space occupancy survey response message including the individual user's local location information collected by, and stored in the storage memory repository of, the individual user's computer device before the individual user's computer device receives the space occupancy survey query email message;

generating, with the location survey server, displayable user information in the web page, the displayable user information including:
a) the permanent occupancy information retrieved from the user record associated with the individual user associated with the computer device, and
b) the individual user's local location information received from the individual user's computer device; and generating, with the location survey server, at least one user-selectable user interface element in the web page that when manually selected via a browser application operating in the individual user's computer device selects one of the displayable user information in a) or b) as a user manual confirmation of the individual user's correct current location occupancy in the campus.

11. The method of claim 10, wherein the location survey server includes in the space occupancy survey query email message an email address matching an email address stored in the individual user's computer device, which identifies to an email client application operating in the individual user's computer device that the email client application is the destined recipient of the space occupancy survey query email message.

12. The method of claim 11, wherein the space occupancy survey query email message, in response to being displayed by the email client application on a user interface of the individual user's computer device, displays the web page link on the user interface, and based on the displayed web page link being manually selected by a user interface element of the email client application, automatically executing the browser application operating in the individual user's computer device which follows the manually selected web page link by its IP address to access the web page on the information processing system on the computer network and display the web page on a user interface of the individual user's computer device.

13. The method of claim 10, wherein the location survey server generates the displayable user information in a) for display in a first cell at an intersection of a first row and a first column in the displayed web page; and wherein the location survey server generates the displayable user information in b) for display in a second cell at an intersection of the first row and a second column in the displayed web page; and wherein the location survey server generates the at least one user-selectable user interface element in the web page comprising
a first user selectable user interface element visually associated with the first cell containing the displayable user information in a) in the displayed web page, and
a second user selectable user interface element visually associated with the second cell containing the displayable user information in b) in the displayed web page; and the method further comprising:
determining, with the location survey server, a user manual confirmation of the individual user's correct current space occupancy in the campus being the displayable user information in a), based on detecting a manual selection of the first user selectable user interface element selected from the at least one user-selectable user interface element; and
determining, with the location survey server, a user manual confirmation of the individual user's correct current space occupancy in the campus being the displayable user information in b), based on detecting a manual selection of the second user selectable user interface element selected from the at least one user-selectable user interface element.

14. The method of claim 13, further comprising:
generating, with the location survey server, a displayable at least one indicator in the web page, the displayable at least one indicator being displayed in the first row in visual association with the first cell and the second cell, the indicator visually indicating whether the displayable user information in the second cell fails to match the displayable user information in the first cell; and
with the displayable at least one indicator in the web page visually indicating that the displayable user information in the second cell fails to match the displayable user information in the first cell, determining, with the location survey server, a user manual confirmation of the individual user's correct current space occupancy in the campus being:
the displayable user information in the first cell, based on detecting a manual selection of the first user selectable user interface element in the web page, or
the displayable user information in the second cell, based on detecting a manual selection of the second user selectable user interface element in the web page; and
updating, with the location survey server, the assigned permanent occupancy information stored in the user record in the space occupancy database to match the displayable user information in the second cell, based on detecting the manual selection of the second user selectable user interface element in the web page.

15. The method of claim 13, further comprising:
generating, with the location survey server, a third cell at an intersection of the first row and a third column in the displayed web page, the third cell comprising a blank text-entry field for accepting displayed text typed into the third cell via the browser application operating in the individual user's computer device;
generating, with the location survey server, the at least one user-selectable user interface element in the web page comprising a third user selectable user interface element visually associated with the third cell containing the displayed text typed into the third cell in the displayed web page; and the method further comprising:
determining, with the location survey server, a user manual confirmation of the individual user's correct current space occupancy in the campus being the displayed text typed into the third cell in the displayed web page, based on detecting a manual selection of the third user selectable user interface element selected from the at least one user-selectable user interface element.

16. A system for surveying space occupancy of individual users in a campus by communicating with each individual user's computer device, the system comprising:
a location survey server including at least one processor, memory communicatively coupled to the processor, and a space occupancy survey messaging controller communicatively coupled to the processor, wherein the location survey server is communicatively coupled with a computer network;
a space occupancy database communicatively coupled with the location survey server, the space occupancy database comprising a plurality of user records respectively associated with a plurality of individual users, each user record containing an individual user's assigned permanent occupancy information associated with a defined assigned user location (a space) in a defined geographic region (a campus);
a plurality of computer devices each being respectively associated with an individual user in the plurality of individual users, the plurality of computer devices being communicatively coupled with the computer network, wherein each computer device in the plurality of computer devices includes at least one processor communicatively coupled with memory, a location data manager, and a storage memory repository, in the computer device, the storage memory repository storing local space occupancy information of the individual user respectively associated with the each computer device, and wherein the processor of the computer device, in response to executing computer instructions, performs the following operations:
collecting, by the location data manager interoperating with the processor of the computer device in the plurality of computer devices, local space occupancy information of an individual user respectively associated with the computer device, based on the computer device receiving information signals from, and while operating in, a vicinity local to the computer device, and storing the local space occupancy information in the storage memory repository of the computer device; and
the processor of the location survey server, in response to executing computer instructions, performs the following operations:
sending, by the location survey server, a plurality of space occupancy survey query email messages, each being addressed and destined for reception respectively by each computer device in the plurality of computer devices respectively associated with each individual user in the plurality of individual users, the each space occupancy survey query email message including a web page link that when followed by a browser application operating in the each individual user's computer device points to a web page on an information processing system communicatively coupled with the computer network;

receiving, by the location survey server, an automatic space occupancy survey response message transmitted, in response to, and independent from an individual user being at the computer device, receiving the space occupancy survey query email message by the computer device associated with the individual user, the automatic space occupancy survey response message including the individual user's local location information collected by, and stored in the storage memory repository of, the individual user's computer device before the individual user's computer device receives the space occupancy survey query email message;

generating, with the location survey server, displayable user information in the web page, the displayable user information including:
  a) the permanent occupancy information retrieved from the user record associated with the individual user associated with the computer device, and
  b) the individual user's local location information received from the individual user's computer device; and generating, with the location survey server, at least one user-selectable user interface element in the web page that when manually selected via a browser application operating in the individual user's computer device selects one of the displayable user information in a) or b) as a user manual confirmation of the individual user's correct current location occupancy in the campus.

17. The system of claim 16, wherein the processor of the location survey server, in response to executing computer instructions, performs the following operations:
  inserting into the space occupancy survey query email message an email address matching an email address stored in the individual user's computer device, which identifies to an email client application operating in the individual user's computer device that the email client application is the destined recipient of the space occupancy survey query email message.

18. The system of claim 17, wherein the processor of the individual user's computer device, in response to executing computer instructions, performs the following operations:
  by an email client application operating in the individual user's computer device,
    determining, based on a comparison of an email address in a space occupancy survey query email message received from the computer network, compared to an email address stored in the memory in the individual user's computer device, that the email client application is the destined recipient of the received space occupancy survey query email message;
    in response to the determining, displaying, on a user interface of the individual user's computer device, the received space occupancy survey query email message including the web page link; and
    detecting that the displayed web page link is manually selected by a user interface element of the email client application; and in response to the detecting that the displayed web page link is manually selected, automatically executing the browser application operating in the individual user's computer device, wherein by the automatically executing browser application,
    follows the manually selected web page link by its IP address to access the web page on the information processing system on the computer network, and
    displays the web page on a user interface of the individual user's computer device, wherein the displayed web page includes user information including:
      a) the permanent occupancy information retrieved from the user record associated with the individual user associated with the computer device, and
      b) the individual user's local location information received from the individual user's computer device; and
    detects that at least one user-selectable user interface element in the web page is manually selected to select one of the displayable user information in a) or b) as a user manual confirmation of the individual user's correct current location occupancy in the campus.

19. The system of claim 18, wherein the processor of the individual user's computer device, in response to executing computer instructions, performs the following operations:
  in response to the detecting that the at least one user-selectable user interface element in the web page is manually selected,
  generating an individual user space occupancy survey response message including indication of the manually-selected one of the displayable user information in a) or b) as a user manual confirmation of the individual user's correct current location occupancy in the campus; and
  transmitting the individual user space occupancy survey response message to the location survey server.

20. The system of claim 19, wherein the processor of the location survey server, in response to executing computer instructions, performs the following operations:
  sending the plurality of space occupancy survey query email messages, each being addressed and destined for reception respectively by each computer device in the plurality of computer devices respectively associated with each individual user in the plurality of individual users:
  receiving a plurality of the automatic space occupancy survey response messages respectively transmitted by the plurality of computer devices respectively associated with the plurality of individual users; and
  receiving a plurality of individual user space occupancy survey response messages respectively by the plurality of computer devices respectively associated with the plurality of individual users, each received individual user space occupancy survey response message indicating a selection of the manually-selected one of the displayable user information in a) or b) as a user manual confirmation of the each individual user's correct current location occupancy in the campus.

* * * * *